US008952950B2

(12) United States Patent
Chung

(10) Patent No.: US 8,952,950 B2
(45) Date of Patent: Feb. 10, 2015

(54) DISPLAY APPARATUS AND APPARATUS AND METHOD FOR GENERATING POWER VOLTAGES

(75) Inventor: Ho-Ryun Chung, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 989 days.

(21) Appl. No.: 12/659,613

(22) Filed: Mar. 15, 2010

(65) Prior Publication Data

US 2011/0057913 A1 Mar. 10, 2011

(30) Foreign Application Priority Data

Sep. 4, 2009 (KR) ........................ 10-2009-0083506

(51) Int. Cl.
*G06F 3/038* (2013.01)
*G09G 3/32* (2006.01)

(52) U.S. Cl.
CPC ........ *G09G 3/3291* (2013.01); *G09G 2310/027* (2013.01); *G09G 2320/0673* (2013.01); *G09G 2330/028* (2013.01); *G09G 2330/06* (2013.01)
USPC ............................................. 345/211; 345/76

(58) Field of Classification Search
CPC ..... G09G 3/30; G09G 3/3208; G09G 3/3258; G09G 3/3291; G06F 3/038
USPC ................ 345/55, 76–77, 204, 211–215, 690
See application file for complete search history.

(56) References Cited

U.S. PATENT DOCUMENTS

| | | | | |
|---|---|---|---|---|
| 7,106,319 | B2 * | 9/2006 | Ishiyama | 345/211 |
| 2002/0149575 | A1 * | 10/2002 | Moon | 345/204 |
| 2004/0017341 | A1 * | 1/2004 | Maki | 345/87 |
| 2009/0066683 | A1 * | 3/2009 | Kim | 345/211 |
| 2009/0108744 | A1 * | 4/2009 | Park et al. | 313/504 |
| 2009/0218937 | A1 | 9/2009 | Lee | |

FOREIGN PATENT DOCUMENTS

| | | | |
|---|---|---|---|
| KR | 1020080062774 | * | 7/2008 |
| KR | 10-0893473 B1 | | 4/2009 |

* cited by examiner

*Primary Examiner* — Amare Mengistu
*Assistant Examiner* — Stacy Khoo
(74) *Attorney, Agent, or Firm* — Lee & Morse, P.C.

(57) ABSTRACT

An apparatus for generating power voltages of a display apparatus including a plurality of pixel circuits comprises a storage capacitor power outputting unit configured to generate a storage capacitor power voltage using a first power voltage and apply the storage capacitor power voltage to storage capacitors included in the plurality of pixel circuits, and a gamma filter power outputting unit configured to generate a gamma filter power voltage using the first power voltage and apply the gamma filter power voltage to a gamma voltage generating unit. The first power voltage is generated from a power voltage supplied by a voltage source. The storage capacitor power voltage and the gamma filter power voltage are generated so as to have the same phase.

19 Claims, 7 Drawing Sheets

DISPLAY APPARATUS AND APPARATUS AND METHOD FOR GENERATING POWER VOLTAGES

BACKGROUND

1. Field

The embodiments relate to a display apparatus, an apparatus for generating power voltages, and a method thereof, and more particularly, to a display apparatus generating a storage capacitor power voltage and a gamma filter power voltage from a voltage supplied by a voltage source, an apparatus for generating a storage capacitor power voltage and a gamma filter power voltage from a voltage supplied by a voltage source, and a method thereof.

2. Description of the Related Art

A display apparatus including a plurality of pixels controls brightness of each of the pixels by applying a data driving signal corresponding to input data to each of the pixels. By using the data driving signal, the display apparatus converts the input data into an image, and displays the image to a user. The data driving signals to be output to the plurality of pixels are generated by a data driving unit. The data driving unit selects a gamma voltage corresponding to the input data from a plurality of gamma voltages. The gamma voltages are generated by a gamma filter circuit. The data driving unit outputs the selected gamma voltage to a plurality of pixel circuits as the data driving signal.

SUMMARY

Embodiments are therefore directed to a display apparatus generating a storage capacitor power voltage and a gamma filter power voltage from a voltage supplied by a voltage source, an apparatus for generating a storage capacitor power voltage and a gamma filter power voltage from a voltage supplied by a voltage source, and a method thereof, which substantially overcome one or more of the problems due to the limitations and disadvantages of the related art.

It is therefore a feature of an embodiment to provide a display apparatus, comprising: a plurality of pixel circuits including a storage capacitor that stores a voltage potential of a data driving signal; a data driving unit including a gamma voltage generating unit configured to generate a plurality of gamma voltages, data driving unit configured to generate a plurality of data driving signals from the plurality of gamma voltages, and output the plurality of data driving signals to the plurality of pixel circuits; a scan driving unit configured to generate a plurality of scan signals and output the plurality of scan signals to the plurality of pixel circuits; and a power voltage generating unit configured to generate a gamma filter power voltage and a storage capacitor power voltage using a first power voltage, apply the gamma filter power voltage to the gamma voltage generating unit, and apply the storage capacitor power voltage to the storage capacitors included in the plurality of pixels, wherein the first power voltage is generated from a power voltage supplied by a voltage source, and the gamma filter power voltage and the storage capacitor power voltage have the same phase.

The power voltage generating unit may comprise: a storage capacitor power outputting unit configured to generate the storage capacitor power voltage and output the storage capacitor power voltage; and a gamma filter power outputting unit configured to generate the gamma filter power voltage and output the gamma filter power voltage.

The power voltage generating unit may further comprise a voltage dividing unit configured to generate a second power voltage and a third power voltage from the first power voltage, output the second power voltage to the storage capacitor power outputting unit, and output the third power voltage to the gamma filter power outputting unit, wherein the storage capacitor power outputting unit may generate the storage capacitor power voltage from the second power voltage, wherein the gamma filter power outputting unit may generate the gamma filter power voltage from the third power voltage, and wherein the second power voltage and the third power voltage may have the same phase.

The voltage dividing unit may include a first resistor and a second resistor, the first and second resistors may be coupled in series, one end of the first resistor may be coupled to an input of the storage capacitor power outputting unit, and the other end of the first resistor and one end of the second resistor may be coupled to an input of the gamma filter power outputting unit.

The gamma filter power outputting unit may generate a fourth power voltage from the storage capacitor power voltage and generate the gamma filter power voltage from the fourth power voltage, and the fourth voltage and the storage capacitor power voltage may have the same phase.

The gamma filter power outputting unit may include a third resistor and a fourth resistor, the third and fourth resistors may be coupled in series, and one end of the third resistor may be coupled to an output of the storage capacitor power outputting unit.

The display apparatus may be an organic light emitting diode (OLED) display apparatus.

The power voltage generating unit may comprise a reference voltage outputting unit configured to generate the first power voltage from the power voltage supplied by a voltage source, and output the first power voltage.

The first power voltage generated may be divided so as to generate the storage capacitor power voltage and the gamma filter power voltage.

The gamma voltage generating unit may divide the gamma filter power voltage into the plurality of gamma voltages so that the plurality of gamma voltages and the storage capacitor power voltage have the same phase.

It is therefore another feature of an embodiment to provide an apparatus for generating power voltages of a display apparatus including a plurality of pixel circuits, the apparatus comprising: a storage capacitor power outputting unit configured to generate a storage capacitor power voltage using a first power voltage and apply the storage capacitor power voltage to storage capacitors, each included in each of the plurality of pixel circuits; and a gamma filter power outputting unit configured to generate a gamma filter power voltage using the first power voltage and apply the gamma filter power voltage to a gamma voltage generating unit, wherein the first power voltage is generated from a power voltage supplied by a voltage source, and the storage capacitor power voltage and the gamma filter power voltage have the same phase.

The apparatus may further comprise a voltage dividing unit configured to generate a second power voltage and a third power voltage from the first power voltage, output the second power voltage to the storage capacitor power outputting unit, and output the third power voltage to the gamma filter power outputting unit, wherein the storage capacitor power outputting unit may generate the storage capacitor power voltage from the second power voltage, wherein the gamma filter power outputting unit may generate the gamma filter power voltage from the third power voltage, and wherein the second power voltage and the third power voltage may have the same phase.

The voltage dividing unit may include a first resistor and a second resistor, the first and second resistors may be coupled in series, one end of the first resistor may be coupled to an input of the storage capacitor power outputting unit, and the other end of the first resistor and one end of the second resistor may be coupled to an input of the gamma filter power outputting unit.

The gamma filter power outputting unit may generate a fourth power voltage from the storage capacitor power voltage and generate the gamma filter power voltage from the fourth power voltage, and the fourth voltage and the storage capacitor power voltage may have the same phase.

The gamma filter power outputting unit may include a third resistor and a fourth resistor, the third and fourth resistors may be coupled in series, and one end of the third resistor may be coupled to an output of the storage capacitor power outputting unit.

The display apparatus may be an OLED display apparatus.

The power voltage generating unit may comprise a reference voltage outputting unit configured to generate the first power voltage from the power voltage supplied by a voltage source, and output the first power voltage.

The first power voltage may be divided so as to generate the storage capacitor power voltage and the gamma filter power voltage.

It is therefore another feature of an embodiment to provide a method for generating a power voltage to be supplied to a display apparatus including a plurality of pixel circuits including a storage capacitor, a data driving unit including a gamma voltage generating unit, and a scan driving unit, the method comprising: generating a storage capacitor power voltage using a first power voltage and outputting the storage capacitor power voltage to the storage capacitor; and generating a gamma filter power voltage using the first power voltage and outputting the gamma filter power voltage to the gamma voltage generating unit, wherein the first power voltage is generated from a power voltage supplied by a voltage source, and the gamma filter power voltage and the storage capacitor power voltage have the same phase.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
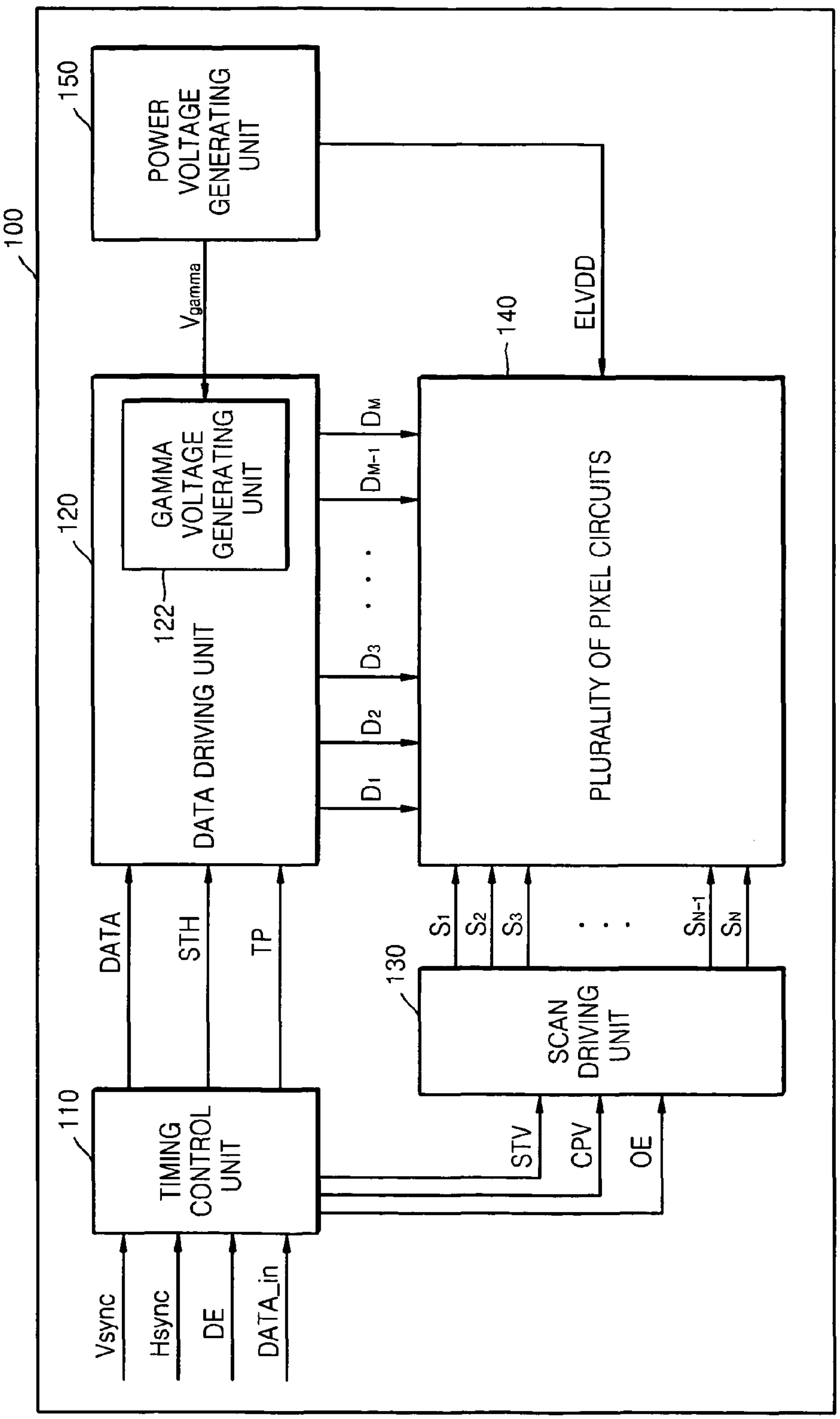
FIG. 1 illustrates a schematic block diagram of a display apparatus according to an embodiment.

Korean Patent Application No. 10-2009-0083506, filed on Sep. 4, 2009, in the Korean Intellectual Property Office, and entitled: "Display Apparatus and Apparatus and Method for Generating Power Voltage," is incorporated by reference herein in its entirety.

Exemplary embodiments will now be described more fully hereinafter with reference to the accompanying drawings; however, they may be embodied in different forms and should not be construed as limited to the embodiments set forth herein.

Also, when an element is referred to as being "connected to" or "coupled to" other element, it can be directly connected to or coupled to the other element or be indirectly connected to or coupled to the other element with one or more intervening elements interposed therebetween. Hereinafter, like reference numerals refer to like elements.

FIG. 1 illustrates a schematic block diagram of a display apparatus 100 according to an embodiment. Referring to FIG. 1, the display apparatus 100 may include a timing control unit 110, a data driving unit 120, a scan driving unit 130, a plurality of pixel circuits 140, and a power voltage generating unit 150.

The timing control unit 110 may receive a vertical synchronization (sync) signal Vsync, a horizontal sync signal Hsync, a data enable signal DE, and an image data signal DATA_in. The timing control unit 110 may convert the image data signal DATA_in to a RGB data signal DATA, and output the RGB data signal DATA to the data driving unit 120 according to the requirements of the data driving unit 120. The timing control unit 110 may also generate a start horizontal signal STH and a load signal TP, and may output the signals STH and TP to the data driving unit 120. The signals STH and TP may be used to provide a reference time period for which data driving signals $D_1, D_2, \ldots, D_M$ are output to the pixel circuits 140 from the data driving unit 120.

Also, the timing control unit 110 may output a start vertical signal STV, a gate clock signal CPV, and an output enable signal OE to the scan driving unit 130. The start vertical signal STV may be used for selecting a first scan line. The gate clock signal CPV may be used for sequentially selecting the next gate line. The output enable signal OE may be used for controlling an output of the scan driving unit 130.

The data driving unit 120 may include a plurality of data driver integrated circuits (ICs). The data driving unit 120 may receive the RGB data signal DATA and the signals STH and TP, which are input from the timing control unit 110. The data driving unit 120 may generate the data driving signals $D_1, D_2, \ldots, D_M$, and output each of the data driving signals $D_1, D_2, \ldots, D_M$ to each data line. The data driving signals $D_1, D_2, \ldots, D_M$ may be applied to the pixel circuits 140.

The data driving unit 120 may include a gamma voltage generating unit 122. The gamma voltage generating unit 122 may divide a gamma filter power voltage Vgamma into a plurality of gamma voltages.

The scan driving unit 130 may include a plurality of scan driver ICs. The scan driving unit 130 may apply each of a plurality of scan signals $S_1, S_2, \ldots, S_N$ to each of the scan lines connected to the pixel circuits 140 according to the signals CPV, STV, and OE provided by the timing control unit 110.

The scan driving unit 130 may sequentially scan the pixel circuits 140 per pixel circuits connected to each scan line. For example, pixel circuits 140 arranged in the same row may be connected to the same scan line. In this case, the pixel circuits 140 may be sequentially scanned per pixel circuits connected to each scan line.

The pixel circuits 140 may be driven according to the scan signals $S_1$, $S_2$, . . . , $S_N$ and the data driving signals $D_1$, $D_2$, . . . , $D_M$. The pixel circuits 140 may emit light according to the driving signals $D_1$, $D_2$, . . . , $D_M$. The pixel circuits 140 may be arranged in the form of a two dimensional matrix such as an M×N matrix (M and N are natural numbers). Also, the pixel circuits 140 may emit light by using, for example, organic light emitting diodes (OLEDs). An anode power voltage ELVDD and a cathode power voltage ELVSS may be applied to each of the pixel circuits 140 to drive each of the pixel circuits 140.

Each of the pixel circuits 140 may include a storage capacitor Cst used to store voltage potentials of the driving signals $D_1$, $D_2$, . . . , $D_M$. To store any of the voltage potentials of the driving signals $D_1$, $D_2$, . . . , $D_M$, the storage capacitor Cst may use a power voltage other than the anode power voltage ELVDD and the cathode power voltage ELVSS. A power voltage connected to the storage capacitor Cst is referred to as a storage capacitor power voltage. The storage capacitor power voltage may be the same as the anode power voltage ELVDD. However, embodiments are not limited thereto. The storage capacitor power voltage may be different from the anode power voltage ELVDD.

Figure 2:
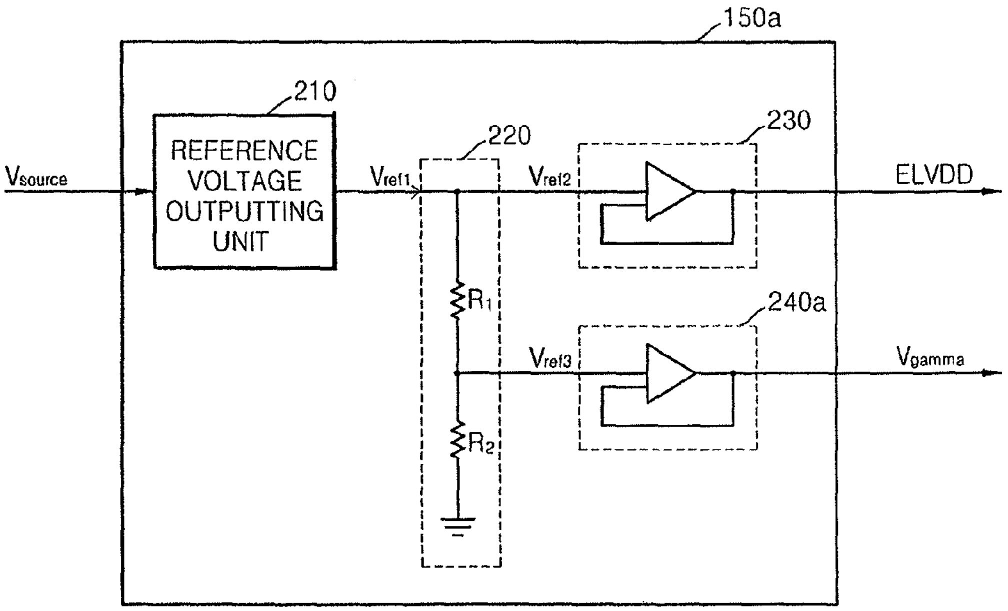
FIG. 2 illustrates a schematic circuit diagram of a power voltage generating unit according to an embodiment.

FIG. 2 illustrates a schematic circuit diagram of a power voltage generating unit 150*a* according to an embodiment. Referring to FIG. 2, the power voltage generating unit 150*a* may divide a first power voltage Vref1 so as to produce a gamma filter power voltage Vgamma and a storage capacitor power voltage ELVDD. The power voltage generating unit 150*a* may include a reference voltage outputting unit 210, a voltage dividing unit 220, a storage capacitor power outputting unit 230, and a gamma filter power outputting unit 240*a*.

The reference voltage outputting unit 210 may receive an external power voltage Vsource from an external voltage source (not shown), and generate the first power voltage Vref1. The reference voltage outputting unit 210 may adjust a voltage potential of the first power voltage Vref1 for the process of reducing/cancelling noise associated with the external power voltage Vsource.

The voltage dividing unit 220 may divide the first power voltage Vref1 so as to produce a second power voltage Vref2 and a third power voltage Vref3. The voltage dividing unit 220 may adjust resistances of resistors R1 and R2, and produce desired potentials of the second power voltage Vref2 and the third power voltage Vref3, respectively.

The storage capacitor power outputting unit 230 may amplify the second power voltage Vref2, and output the storage capacitor power voltage ELVDD to the pixel circuits 140.

The gamma filter power outputting unit 240*a* may amplify the third power voltage Vref3, and output the gamma filter power voltage Vgamma to the pixel circuits 140.

The storage capacitor power outputting unit 230 and the gamma filter power outputting unit 240*a* may be implemented using an operational amplifier (op-amp) that is a source follower.

Figure 3:
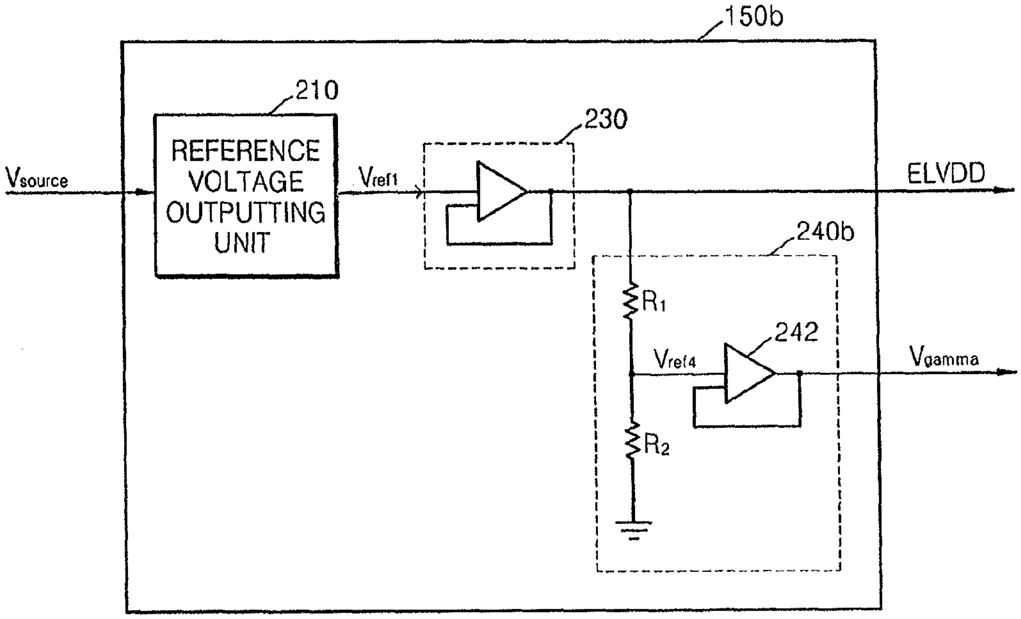
FIG. 3 illustrates a schematic circuit diagram of a power voltage generating unit according to another embodiment.

FIG. 3 illustrates a schematic circuit diagram of a power voltage generating unit 150*b* according to another embodiment. Referring to FIG. 3, the power voltage generating unit 150*b* may include the reference voltage outputting unit 210, the storage capacitor power outputting unit 230, and a gamma filter power outputting unit 240*b*.

The storage capacitor power outputting unit 230 may amplify the first power voltage Vref1 generated by the reference voltage outputting unit 210, and output the storage capacitor power voltage ELVDD to the pixel circuits 140.

The gamma filter power outputting unit 240*b* may divide the storage capacitor power voltage ELVDD output from the storage capacitor power outputting unit 230 and obtain the divided storage capacitor power voltage, that is, a fourth power voltage Vref4. The gamma filter power outputting unit 240*b* may amplify the fourth power voltage Vref4, and output the gamma filter power voltage Vgamma. For example, the gamma filter power outputting unit 240*b* may include resistors R1 and R2. Resistances of the resistors R1 and R2 may be adjusted to obtain a desired potential of the gamma filter power voltage Vgamma. Also, the gamma filter power outputting unit 240*b* may include a source follower 242 used to amplify the fourth power voltage Vref4.

Figure 4A:
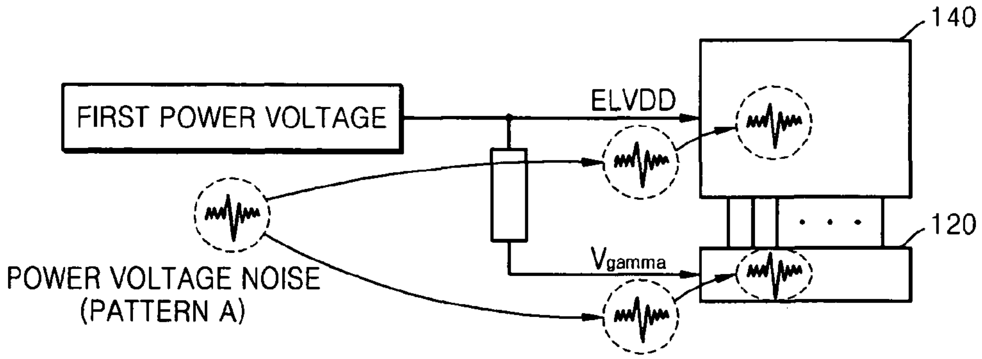
FIG. 4A illustrates a diagram for explaining a mechanism of cancelling/reducing noise associated with an external power voltage or a first power voltage according to the embodiments.

FIG. 4A illustrates a diagram for explaining a mechanism of cancelling/reducing noise associated with the external power voltage Vsource or the first power voltage Vref1 according to the embodiments.

Referring to FIG. 4A, a power voltage noise having a pattern A may be included in the first power voltage Vref1 generated by the reference voltage outputting unit 210. Since both the storage capacitor power voltage ELVDD and the gamma filter power voltage Vgamma are generated from the first power voltage Vref1, the storage capacitor power voltage ELVDD and the gamma filter power voltage Vgamma may have noise having the same pattern A. More specifically, resistors may be used to divide the first power voltage Vref1 so as to produce the storage capacitor power voltage ELVDD and the gamma filter power voltage Vgamma. Therefore, the storage capacitor power voltage ELVDD and the gamma filter power voltage Vgamma may have noise having the same phase. The respective data driving signals $D_1$, $D_2$, . . . , $D_M$ that are generated from the gamma filter power voltage Vgamma may be applied to one end of the storage capacitor Cst included in each pixel circuit, while the storage capacitor power voltage ELVDD may be applied to the other end of the storage capacitor Cst included in each pixel circuit. Therefore, noise included in each of the data driving signals $D_1$, $D_2$, . . . , $D_M$ that are generated from the gamma filter power voltage Vgamma may be cancelled/reduced in the storage capacitor Cst. Accordingly, the noise included in the power voltage may be prevented from causing flickering.

Figure 4B:
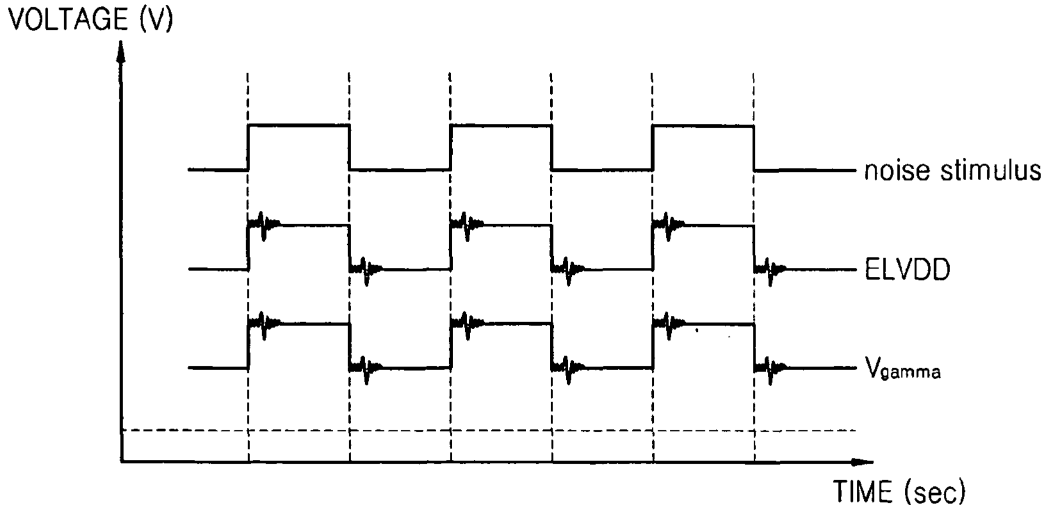
FIG. 4B illustrates waveforms of a storage capacitor power voltage and a gamma filter power voltage for explaining the mechanism of cancelling/reducing noise associated with the external power voltage or the first power voltage according to the embodiments.

FIG. 4B illustrates waveforms of a storage capacitor power voltage and a gamma filter power voltage for explaining the mechanism of cancelling/reducing noise associated with the external power voltage or the first power voltage according to the embodiments. Here, the power voltage generating unit 150*b* adds noise to the first power voltage Vref1 by using a noise stimulus signal. Referring to FIG. 4B, the storage capacitor power voltage ELVDD and the gamma filter power voltage Vgamma have noise having the same pattern and the same phase.

Figure 5:
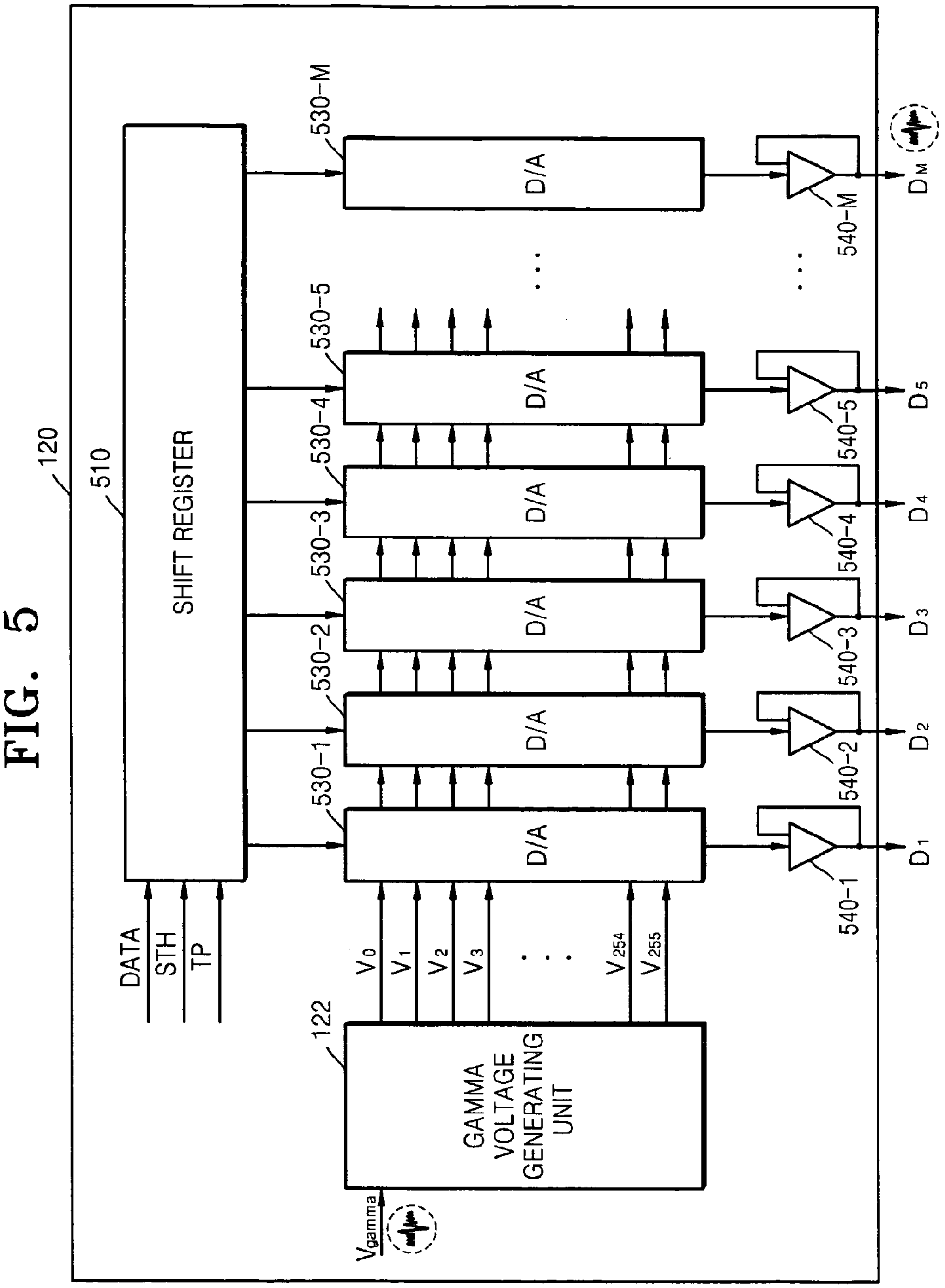
FIG. 5 illustrates a schematic circuit diagram of a data driving unit according to an embodiment.

FIG. 5 illustrates a schematic circuit diagram of the data driving unit 120 according to an embodiment. Referring to FIG. 5, the data driving unit 120 may include a gamma voltage generating unit 122, a shift register 510, a plurality of digital-analog converters 530-1, 530-2, . . . , 530-M, and a plurality of data driving signal outputting units 540-1, 540-2, . . . , 540-M.

The shift register 510 may receive the RGB data signal DATA and the signals STH and TP, and output the RGB data signals DATA to the plurality of digital-analog converters 530-1, 530-2, . . . , 530-M that correspond to the data lines, respectively.

The gamma voltage generating unit 122 may receive the gamma filter power voltage Vgamma, generate a plurality of gamma voltages $V_0, V_1, \ldots, V_{255}$, and apply the plurality of gamma voltages $V_0, V_1, \ldots, V_{255}$ to the plurality of digital-analog converters 530-1, 530-2, . . . , 530-M. The gamma voltage generating unit 122 may generate different gamma voltages corresponding to the RGB data signal DATA. Also, the number of the plurality of gamma voltages $V_0, V_1, \ldots, V_{255}$ is not limited to 256 as illustrated in FIG. 5. The number of the gamma voltages may be determined according to the requirements of the display apparatus 100.

The digital-analog converters 530-1, 530-2, . . . , 530-M may select gamma voltages corresponding to the RGB data signal DATA from the gamma voltages $V_0, V_1, \ldots, V_{255}$ input from the gamma voltage generating unit 122. The digital-analog converters 530-1, 530-2, . . . , 530-M may output the selected gamma voltages to the data driving signal outputting units 540-1, 540-2, . . . , 540-M, respectively. To this end, the RGB data signal DATA output to each of the digital-analog converters 530-1, 530-2, . . . , 530-M may act as a selection signal.

The data driving signal outputting units 540-1, 540-2, . . . , 540-M may amplify the gamma voltages input from the digital-analog converters 530-1, 530-2, . . . , 530-M. The data driving signal outputting units 540-1, 540-2, . . . , 540-M may output the data driving signals $D_1, D_2, \ldots, D_M$ corresponding data lines. The data driving signal outputting units 540-1, 540-2, . . . , 540-M may be implemented using an operational amplifier that is a source follower.

Figure 6:
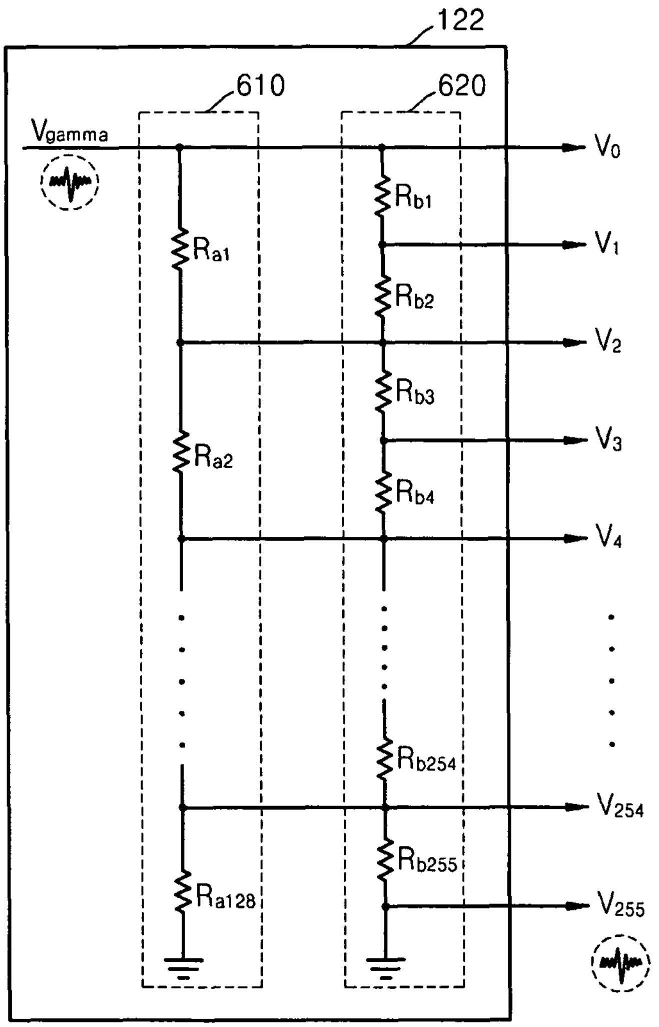
FIG. 6 illustrates a schematic circuit of a gamma voltage generating unit according to an embodiment.

FIG. 6 illustrates a schematic circuit of the gamma voltage generating unit 122 according to an embodiment. Referring to FIG. 6, the gamma voltage generating unit 122 may include a gamma reference voltage output unit 610 and a gamma filter circuit 620. The gamma reference voltage output unit 610 may generate a plurality of gamma reference voltages by dividing the gamma filter power voltage Vgamma using a plurality of resistors Ra1, Ra2, . . . , Ra128. The gamma filter circuit 620 may generate the gamma voltages $V_0, V_1, \ldots, V_{255}$ by dividing the gamma reference voltages by using a plurality of resistors Rb1, Rb2, Rb3, Rb4, . . . , Rb254, and Rb255.

The gamma voltage generating unit 122 may uses the resistors Ra1, Ra2, . . . , Ra128 to divide the gamma filter power voltage Vgamma. Therefore, when noise included in the gamma filter power voltage Vgamma is transferred to the gamma voltages $V_0, V_1, \ldots, V_{255}$, the noise may maintain its phase and pattern. When the noise included in each of the gamma voltages $V_0, V_1, \ldots, V_{255}$ is transferred to each of the data driving signals $D_1, D_2, \ldots, D_M$ through each of the digital-analog converters 530-1, 530-2, . . . , 530-M and each of the data driving signal outputting units 540-1, 540-2, . . . , 540-M, the noise may maintain its phase and pattern.

Figure 7:
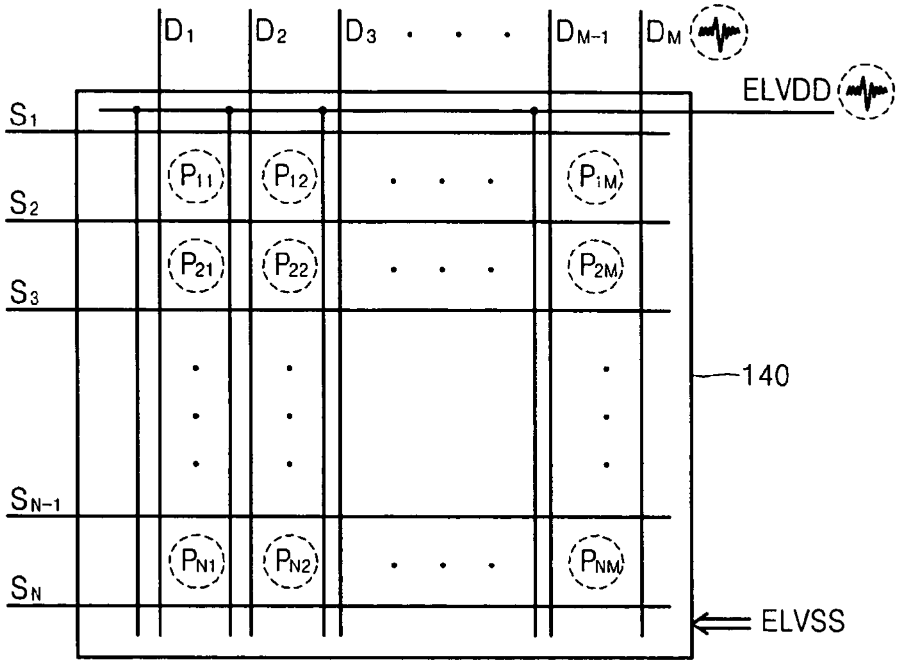
FIG. 7 illustrates a schematic configuration of a plurality of pixel circuits according to an embodiment.

FIG. 7 illustrates a schematic configuration of the pixel circuits 140 according to an embodiment. Referring to FIG. 7, the pixel circuits 140 may be arranged where a plurality of data lines transferring the data driving signals $D_1, D_2, \ldots, D_M$ and a plurality of scan lines transferring the scan signals $S_1, S_2, \ldots, S_N$ cross each other. One of the data driving signals $D_1, D_2, \ldots, D_M$ and one of the scan signals $S_1, S_2, \ldots, S_N$ that correspond to one of the pixel circuits 140 $P_1, P_2, \ldots, P_{NM}$ may be applied to the one of the pixel circuits 140 $P_1, P_2, \ldots, P_{NM}$. The anode power voltage ELVDD and the cathode power voltage ELVSS may be applied to each of the pixel circuits 140 $P_1, P_2, \ldots, P_{NM}$ in order to drive each of the pixel circuits 140 $P_1, P_2, \ldots, P_{NM}$. The anode power voltage ELVDD may be used as the storage capacitor power voltage.

Figure 8:
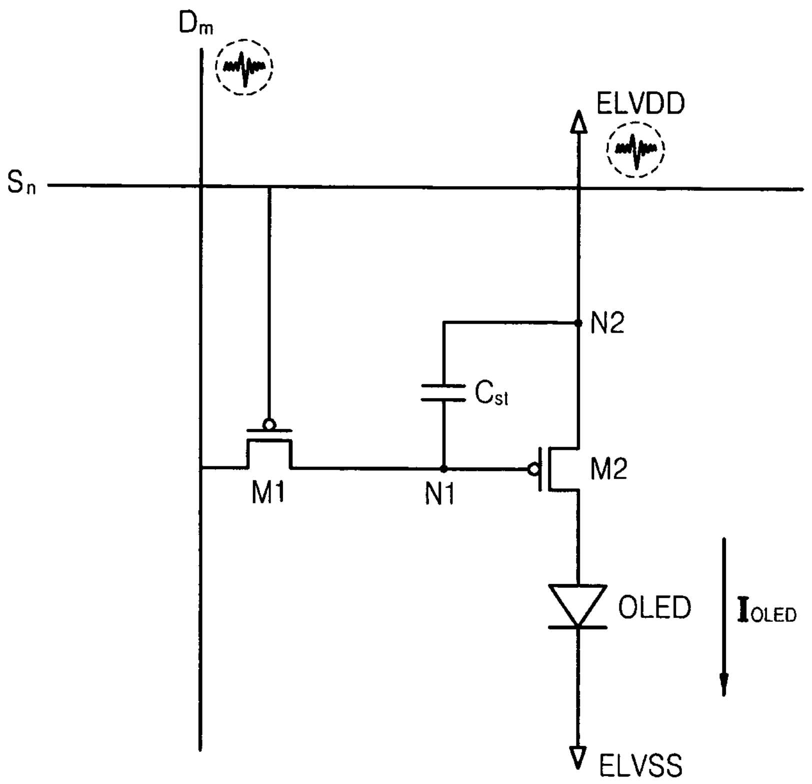
FIG. 8 illustrates a schematic circuit of a pixel circuit according to an embodiment.

FIG. 8 illustrates a schematic circuit of a pixel circuit Pnm according to an embodiment. Referring to FIG. 8, the pixel circuit Pnm may include a scan transistor M1, a driving transistor M2, the storage capacitor Cst, and an OLED. When a scan signal Sn is input, a data driving signal Dm may be applied to a first node N1 through the scan transistor M1. A voltage potential of the data driving signal Dm may be stored in the storage capacitor Cst. The driving transistor M2 may generate a light emitting current $I_{OLED}$ according to a voltage Vgs determined by a voltage potential of the data driving signal Dm stored in the storage capacitor Cst, and output the light emitting current $I_{OLED}$ the OLED.

When noise included in the gamma filter power voltage Vgamma is transferred to each of the data driving signals $D_1, D_2, \ldots, D_M$, the noise may maintain its phase and pattern. The storage capacitor power voltage ELVDD may include noise having the same phase and pattern as the noise included in the gamma filter power voltage Vgamma and the data driving signals $D_1, D_2, \ldots, D_M$. The data driving signals $D_1, D_2, \ldots, D_M$ may be applied to one end N1 of the storage capacitor Cst, while the storage capacitor power voltage ELVDD may be applied to the other end N2 of the storage capacitor Cst. Therefore, the noise included in the data driving signals $D_1, D_2, \ldots, D_M$ may be applied to one end of the storage capacitor Cst, while the noise included in the storage capacitor power voltage ELVDD may be applied to the other end of the storage capacitor Cst. Accordingly, the noise may be cancelled/removed, and the noise included in the power voltages generated by the external voltage source Vsource or the first power voltage Vref1 may be prevented from causing flickering.

Figure 9:
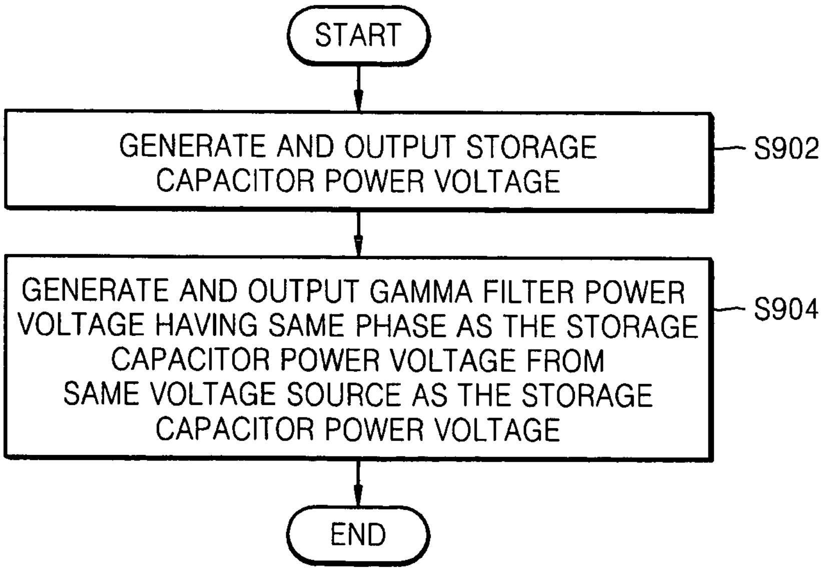
FIG. 9 is a flowchart illustrating a method for generating power voltages to be supplied to a display apparatus according to an embodiment.

FIG. 9 is a flowchart of a method for generating a power voltage to be supplied to a display apparatus according to an embodiment. Referring to FIG. 9, the method for generating power voltages may include generating and outputting a storage capacitor power voltage (operation S902), and generating and outputting a gamma filter power voltage having the same phase as the storage capacitor power voltage from the same voltage source as the storage capacitor power voltage (operation S904). In this regard, the gamma filter power voltage may need to be generated by using a device that does not incur a phase change. For example, the gamma filter power voltage may be generated by dividing a voltage output from the voltage source of the storage capacitor power voltage with resistors.

According to the embodiments, a storage capacitor power voltage and a gamma filter power voltage of a display apparatus may be generated from a voltage source, and reduce/cancel noise generated from the voltage source. Accordingly, flickering caused by the noise may be reduced or prevented.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope as set forth in the following claims.

What is claimed is:

1. A display apparatus, comprising:

a plurality of pixel circuits including a storage capacitor that stores a voltage potential of a data driving signal;

a data driver including a gamma voltage generator configured to generate a plurality of gamma voltages, the data driver being configured to generate a plurality of data driving signals from the plurality of gamma voltages and output the plurality of data driving signals to the plurality of pixel circuits;

a scan driver configured to generate a plurality of scan signals and output the plurality of scan signals to the plurality of pixel circuits; and a power voltage generator configured to generate a gamma filter power voltage and a storage capacitor power voltage using a first power voltage, apply the gamma filter power voltage to the gamma voltage generator, and apply the storage capacitor power voltage to the storage capacitors included in the plurality of pixels, wherein the first power voltage is generated from a power voltage supplied by a voltage source, and the gamma filter power voltage and the storage capacitor power voltage have noise with substantially a same pattern and substantially a same phase corresponding to noise from the first power voltage, and wherein the storage capacitor power voltage is applied to the storage capacitors and the gamma filter power voltage is applied to the gamma voltage generator, wherein the data driving signals include the noise having substantially the same pattern and phase as a result from being generated by the gamma voltages using the first power voltage, wherein the storage capacitor power voltage is applied to the storage capacitors and the gamma filter power voltage is applied to the gamma voltage generator during display and non-display periods of operation of the display apparatus, each of the storage capacitor power voltage and the gamma filter power voltage having same values during the display and non-display periods.

2. The display apparatus as claimed in claim 1, wherein the power voltage generator comprises:

a storage capacitor power outputting circuit configured to generate the storage capacitor power voltage and output the storage capacitor power voltage; and a gamma filter power outputting circuit configured to generate the gamma filter power voltage and output the gamma filter power voltage.

3. The display apparatus as claimed in claim 2, wherein the power voltage generator further comprises a voltage divider configured to generate a second power voltage and a third power voltage from the first power voltage, output the second power voltage to the storage capacitor power outputting circuit, and output the third power voltage to the gamma filter power outputting circuit, wherein the storage capacitor power outputting circuit generates the storage capacitor power voltage from the second power voltage, wherein the gamma filter power outputting circuit generates the gamma filter power voltage from the third power voltage, and wherein the second power voltage and the third power voltage have substantially a same phase.

4. The display apparatus as claimed in claim 3, wherein the voltage divider includes a first resistor and a second resistor, the first and second resistors are coupled in series, one end of the first resistor is coupled to an input of the storage capacitor power outputting circuit, and the other end of the first resistor and one end of the second resistor are coupled to an input of the gamma filter power outputting circuit.

5. The display apparatus as claimed in claim 2, wherein the gamma filter power outputting circuit generates a second power voltage from the storage capacitor power voltage and generates the gamma filter power voltage from the second power voltage, and the second power voltage and the storage capacitor power voltage have substantially a same phase.

6. The display apparatus as claimed in claim 5, wherein the gamma filter power outputting circuit includes a first resistor and a second resistor, the first and second resistors are coupled in series, and one end of the first resistor is coupled to an output of the storage capacitor power outputting circuit.

7. The display apparatus as claimed in claim 1, wherein the display apparatus is an organic light emitting diode (OLED) display apparatus.

8. The display apparatus as claimed in claim 1, wherein the power voltage generator comprises a reference voltage outputting circuit configured to generate the first power voltage from the power voltage supplied by a voltage source, and output the first power voltage.

9. The display apparatus as claimed in claim 1, wherein the first power voltage generated is divided so as to generate the storage capacitor power voltage and the gamma filter power voltage.

10. The display apparatus as claimed in claim 1, wherein the gamma voltage generator divides the gamma filter power voltage into the plurality of gamma voltages so that the plurality of gamma voltages and the storage capacitor power voltage have substantially the same phase.

11. An apparatus for generating power voltages of a display apparatus including a plurality of pixel circuits, the apparatus comprising:

a storage capacitor power outputting circuit configured to generate a storage capacitor power voltage having noise using a first power voltage and apply the storage capacitor power voltage with the noise to storage capacitors, each included in a respective one of the plurality of pixel circuits; and a gamma filter power outputting circuit configured to generate a gamma filter power voltage using the first power voltage, the gamma filter power voltage including substantially a same pattern and substantially a same phase as the storage capacitor power voltage, the gamma filter power outputting circuit to apply the gamma filter power voltage with the noise to a gamma voltage generator, wherein the storage capacitor power voltage is applied to the storage capacitors and wherein the gamma filter power voltage is applied to the gamma voltage generator in display and non-display periods to generate data driving signals include the noise having substantially the same pattern and phase as the gamma filter power voltage, each of the storage capacitor power voltage and the gamma filter power voltage having same values during the display and non-display periods, and wherein the first power voltage is generated from a power voltage supplied by a voltage source.

12. The apparatus as claimed in claim 11, further comprising:

a voltage divider configured to generate a second power voltage and a third power voltage from the first power voltage, output the second power voltage to the storage capacitor power outputting circuit, and output the third power voltage to the gamma filter power outputting circuit, wherein the storage capacitor power outputting circuit generates the storage capacitor power voltage from the second power voltage, wherein the gamma filter power outputting circuit generates the gamma filter power voltage from the third power voltage, and wherein the second power voltage and the third power voltage have substantially a same phase.

13. The apparatus as claimed in claim 12, wherein the voltage divider includes a first resistor and a second resistor, the first and second resistors are coupled in series, one end of the first resistor is coupled to an input of the storage capacitor power outputting circuit, and the other end of the first resistor and one end of the second resistor are coupled to an input of the gamma filter power outputting circuit.

14. The apparatus as claimed in claim 11, wherein the gamma filter power outputting circuit generates a second power voltage from the storage capacitor power voltage and generates the gamma filter power voltage from the second power voltage, and the second power voltage and the storage capacitor power voltage have substantially a same phase.

15. The apparatus as claimed in claim 14, wherein the gamma filter power outputting circuit includes a first resistor and a second resistor, the first and second resistors are coupled in series, and one end of the first resistor is coupled to an output of the storage capacitor power outputting circuit.

16. The apparatus as claimed in claim 11, wherein the display apparatus is an OLED display apparatus.

17. The apparatus as claimed in claim 11, wherein the power voltage generator comprises a reference voltage outputting circuit configured to generate the first power voltage from the power voltage supplied by a voltage source, and output the first power voltage.

18. The apparatus as claimed in claim 11, wherein the first power voltage is divided so as to generate the storage capacitor power voltage and the gamma filter power voltage.

19. A method for generating a power voltage to be supplied to a display apparatus including a plurality of pixel circuits including a plurality of respective storage capacitors, a data driver including a gamma voltage generator, and a scan driver, the method comprising:

generating a storage capacitor power voltage using a first power voltage and outputting the storage capacitor power voltage to the storage capacitors; and generating a gamma filter power voltage using the first power voltage and outputting the gamma filter power voltage to the gamma voltage generator, wherein the first power voltage is generated from a power voltage supplied by a voltage source, wherein the storage capacitor power voltage and the gamma filter power voltage has substantially a same pattern and phase of noise in the first power voltage, wherein the storage capacitor power voltage is output to the storage capacitors and the gamma filter power voltage is output to the gamma voltage generator during display and non-display periods, each of the storage capacitor power voltage and the gamma filter power voltage having same values in the display and non-display periods.

* * * * *